(12) United States Patent
Putnam et al.

(10) Patent No.: US 7,433,123 B2
(45) Date of Patent: Oct. 7, 2008

(54) OPTICAL IDENTIFICATION ELEMENT HAVING NON-WAVEGUIDE PHOTOSENSITIVE SUBSTRATE WITH DIFFRACTION GRATING THEREIN

(75) Inventors: Martin A. Putnam, Cheshire, CT (US); John A. Moon, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 200 days.

(21) Appl. No.: 11/063,660

(22) Filed: Feb. 22, 2005

(65) Prior Publication Data
US 2005/0220408 A1    Oct. 6, 2005

Related U.S. Application Data

(60) Provisional application No. 60/546,445, filed on Feb. 19, 2004, provisional application No. 60/546,435, filed on Feb. 19, 2004, provisional application No. 60/547,013, filed on Feb. 19, 2004.

(51) Int. Cl.
*G02B 5/18* (2006.01)

(52) U.S. Cl. .................. 359/566; 385/37; 385/123

(58) Field of Classification Search ............. None
See application file for complete search history.

(56) References Cited

U.S. PATENT DOCUMENTS

| | | | |
|---|---|---|---|
| 3,891,302 A | 6/1975 | Dabby et al. | |
| 3,916,182 A | 10/1975 | Dabby et al. | |
| 3,968,476 A | 7/1976 | McMahon | |
| 4,011,435 A | 3/1977 | Phelps | |
| 4,023,010 A | 5/1977 | Horst et al. | |
| 4,053,228 A | 10/1977 | Schiller | |
| 4,053,433 A | 10/1977 | Lee | |
| 4,131,337 A | 12/1978 | Moraw et al. | |
| 4,168,146 A | 9/1979 | Grubb et al. | |

(Continued)

FOREIGN PATENT DOCUMENTS

CH    598661 A    5/1978

(Continued)

OTHER PUBLICATIONS

Burstein Technology, Inc.; "Angel Strategies Tombstone"; 1 pg.

(Continued)

*Primary Examiner*—Arnel C Lavarias
(74) *Attorney, Agent, or Firm*—Dean D. Small; Small Patent Law Group

(57) ABSTRACT

An optical identification element (also known herein as a microbead) that is made from pieces of an optical fiber or substrate that includes an inner core or region being surrounded by an outer cladding region. The optical fiber or substrate has an identification code imparted therein containing coded information. The identification code may be in the form of a Bragg grating inscribed or written in either the inner core or outer cladding. The optical identification element may be microscopic in size having a length in a range of 1-1,000 microns or smaller; or for larger applications may have a length of 1.0-1,000 millimeters or more. The outer diameter may be as small as less than 1,000 microns, as well as in a range of 1.0 to 1,000 millimeters for larger applications.

26 Claims, 7 Drawing Sheets

U.S. PATENT DOCUMENTS

| | | | |
|---|---|---|---|
| 4,301,139 A | 11/1981 | Feingers et al. | |
| 4,386,274 A | 5/1983 | Altshuler | |
| 4,400,616 A | 8/1983 | Chevillat et al. | |
| 4,445,229 A | 4/1984 | Tasto et al. | |
| 4,447,546 A | 5/1984 | Hirschfeld | |
| 4,537,504 A | 8/1985 | Baltes et al. | |
| 4,560,881 A | 12/1985 | Briggs | |
| 4,562,157 A | 12/1985 | Lowe et al. | |
| 4,647,544 A | 3/1987 | Nicoli et al. | |
| 4,678,752 A | 7/1987 | Thorne et al. | |
| 4,685,480 A | 8/1987 | Eck | |
| 4,690,907 A | 9/1987 | Hibino et al. | |
| 4,701,754 A | 10/1987 | Provonchee | |
| 4,716,121 A | 12/1987 | Block et al. | |
| 4,725,110 A * | 2/1988 | Glenn et al. | 359/3 |
| 4,740,468 A | 4/1988 | Weng et al. | |
| 4,740,688 A | 4/1988 | Edwards | |
| 4,748,110 A | 5/1988 | Paul | |
| 4,762,420 A | 8/1988 | Bowley | |
| 4,767,719 A | 8/1988 | Finlan | |
| 4,807,950 A | 2/1989 | Glenn et al. | |
| 4,816,659 A | 3/1989 | Bianco et al. | |
| 4,822,746 A | 4/1989 | Walt | |
| 4,841,140 A | 6/1989 | Sullivan et al. | |
| 4,877,747 A | 10/1989 | Stewart | |
| 4,880,752 A | 11/1989 | Keck et al. | |
| 4,882,288 A | 11/1989 | North et al. | |
| 4,921,805 A | 5/1990 | Gebeyehu et al. | |
| 4,931,384 A | 6/1990 | Layton et al. | |
| 4,937,048 A | 6/1990 | Sakai et al. | |
| 4,958,376 A | 9/1990 | Leib | |
| 4,992,385 A | 2/1991 | Godfrey | |
| 5,002,867 A | 3/1991 | Macevicz | |
| 5,003,600 A | 3/1991 | Deason et al. | |
| RE33,581 E | 4/1991 | Nicoli et al. | |
| 5,028,545 A | 7/1991 | Soini | |
| 5,030,558 A | 7/1991 | Litman et al. | |
| 5,033,826 A | 7/1991 | Kolner | |
| 5,065,008 A | 11/1991 | Hakamata et al. | |
| 5,067,155 A | 11/1991 | Bianco et al. | |
| 5,081,012 A | 1/1992 | Flanagan et al. | |
| 5,089,387 A | 2/1992 | Tsay et al. | |
| 5,090,807 A | 2/1992 | Tai | |
| 5,091,636 A | 2/1992 | Takada et al. | |
| 5,095,194 A | 3/1992 | Barbanell | |
| 5,100,238 A | 3/1992 | Nailor et al. | |
| 5,104,209 A | 4/1992 | Hill et al. | |
| 5,105,305 A | 4/1992 | Betzig et al. | |
| 5,114,864 A | 5/1992 | Walt | |
| 5,115,121 A | 5/1992 | Bianco et al. | |
| 5,118,608 A | 6/1992 | Layton et al. | |
| 5,129,974 A | 7/1992 | Aurenius | |
| 5,138,468 A | 8/1992 | Barbanell | |
| 5,141,848 A | 8/1992 | Donovan et al. | |
| 5,143,853 A | 9/1992 | Walt | |
| 5,144,461 A | 9/1992 | Horan | |
| 5,160,701 A | 11/1992 | Brown, III et al. | |
| 5,166,813 A | 11/1992 | Metz | |
| 5,192,980 A | 3/1993 | Dixon et al. | |
| 5,196,350 A | 3/1993 | Backman et al. | |
| 5,200,794 A | 4/1993 | Nishiguma et al. | |
| 5,218,594 A | 6/1993 | Tanno | |
| 5,239,178 A | 8/1993 | Derndinger et al. | |
| 5,244,636 A | 9/1993 | Walt et al. | |
| 5,283,777 A | 2/1994 | Tanno et al. | |
| 5,291,006 A | 3/1994 | Nishiguma et al. | |
| 5,291,027 A | 3/1994 | Kita et al. | |
| 5,300,764 A | 4/1994 | Hoshino et al. | |
| 5,307,332 A | 4/1994 | Tinet | |
| 5,310,686 A | 5/1994 | Sawyers et al. | |
| 5,329,352 A | 7/1994 | Jacobsen | |
| 5,342,790 A | 8/1994 | Levine et al. | |
| 5,349,442 A | 9/1994 | Deason et al. | |
| 5,352,582 A | 10/1994 | Lichtenwalter et al. | |
| 5,364,797 A | 11/1994 | Olson et al. | |
| 5,367,588 A | 11/1994 | Hill et al. | |
| 5,372,783 A | 12/1994 | Lackie | |
| 5,374,816 A | 12/1994 | Bianco | |
| 5,374,818 A | 12/1994 | Bianco et al. | |
| 5,388,173 A | 2/1995 | Glenn | |
| 5,394,234 A | 2/1995 | Bianco et al. | |
| 5,395,558 A | 3/1995 | Tsai | |
| 5,426,297 A | 6/1995 | Dunphy et al. | |
| 5,432,329 A | 7/1995 | O'Boyle et al. | |
| 5,442,433 A | 8/1995 | Hoshino et al. | |
| 5,448,659 A | 9/1995 | Tsutsui et al. | |
| 5,451,528 A | 9/1995 | Raymoure et al. | |
| 5,455,178 A | 10/1995 | Fattinger | |
| 5,461,475 A | 10/1995 | Lerner et al. | |
| 5,465,176 A | 11/1995 | Bianco et al. | |
| 5,468,649 A | 11/1995 | Shah et al. | |
| 5,506,674 A | 4/1996 | Inoue et al. | |
| 5,514,785 A | 5/1996 | Van Ness et al. | |
| 5,528,045 A | 6/1996 | Hoffman et al. | |
| 5,547,849 A | 8/1996 | Baer et al. | |
| 5,559,613 A | 9/1996 | Deveaud-Pledran et al. | |
| 5,585,639 A | 12/1996 | Dorsel et al. | |
| 5,587,832 A | 12/1996 | Krause | |
| 5,607,188 A | 3/1997 | Bahns et al. | |
| 5,610,287 A | 3/1997 | Nikiforov | |
| 5,621,515 A | 4/1997 | Hoshino | |
| 5,624,850 A | 4/1997 | Kumar et al. | |
| 5,625,472 A | 4/1997 | Mizrahi et al. | |
| 5,627,040 A | 5/1997 | Bierre et al. | |
| 5,627,663 A | 5/1997 | Horan et al. | |
| 5,633,724 A | 5/1997 | King et al. | |
| 5,633,790 A | 5/1997 | Gritter et al. | |
| 5,633,975 A * | 5/1997 | Gary et al. | 385/147 |
| 5,667,976 A | 9/1997 | Van Ness et al. | |
| 5,671,308 A | 9/1997 | Inoue et al. | |
| 5,712,912 A | 1/1998 | Tomko et al. | |
| 5,721,435 A | 2/1998 | Troll | |
| 5,729,365 A | 3/1998 | Sweatt | |
| 5,736,330 A | 4/1998 | Fulton | |
| 5,742,432 A | 4/1998 | Bianco | |
| 5,745,615 A | 4/1998 | Atkins et al. | |
| 5,745,617 A | 4/1998 | Starodubov et al. | |
| 5,759,778 A | 6/1998 | Li et al. | |
| 5,760,961 A | 6/1998 | Tompkin et al. | |
| 5,766,956 A | 6/1998 | Groger et al. | |
| 5,771,251 A | 6/1998 | Kringlebotn et al. | |
| 5,776,694 A | 7/1998 | Sheiness et al. | |
| 5,793,502 A | 8/1998 | Bianco et al. | |
| 5,798,273 A | 8/1998 | Shuler et al. | |
| 5,799,231 A | 8/1998 | Gates et al. | |
| 5,801,857 A | 9/1998 | Heckenkamp et al. | |
| 5,804,384 A | 9/1998 | Muller et al. | |
| 5,812,272 A | 9/1998 | King et al. | |
| 5,822,472 A | 10/1998 | Betlach et al. | |
| 5,824,478 A | 10/1998 | Muller | |
| 5,824,557 A | 10/1998 | Burke et al. | |
| 5,830,622 A | 11/1998 | Canning et al. | |
| 5,831,698 A | 11/1998 | Depp et al. | |
| 5,837,475 A | 11/1998 | Dorsel et al. | |
| 5,837,552 A | 11/1998 | Cotton | |
| 5,841,555 A | 11/1998 | Bianco et al. | |
| 5,846,737 A | 12/1998 | Kang | |
| 5,874,187 A | 2/1999 | Colvin et al. | |
| 5,881,197 A * | 3/1999 | Dong et al. | 385/127 |
| 5,895,750 A | 4/1999 | Mushahwar et al. | |
| 5,922,550 A | 7/1999 | Everhart et al. | |
| 5,922,617 A | 7/1999 | Wang | |
| 5,925,562 A | 7/1999 | Nova et al. | |
| 5,925,878 A | 7/1999 | Challener | |

| Patent | Date | Inventor |
|---|---|---|
| 5,945,679 A | 8/1999 | Dorsel et al. |
| 5,972,542 A | 10/1999 | Starodubov |
| 5,976,896 A | 11/1999 | Kumar et al. |
| 5,981,166 A | 11/1999 | Mandecki |
| 5,986,838 A | 11/1999 | Thomas, III |
| 5,989,923 A | 11/1999 | Lowe et al. |
| 5,998,796 A | 12/1999 | Liu et al. |
| 6,001,510 A | 12/1999 | Meng et al. |
| 6,005,691 A | 12/1999 | Grot et al. |
| 6,017,754 A | 1/2000 | Chesnut et al. |
| 6,025,129 A | 2/2000 | Nova et al. |
| 6,025,283 A | 2/2000 | Roberts |
| 6,027,694 A | 2/2000 | Boulton et al. |
| 6,030,581 A | 2/2000 | Virtanen |
| 6,035,082 A | 3/2000 | Murphy et al. |
| 6,036,807 A | 3/2000 | Brongers |
| 6,043,880 A | 3/2000 | Andrews et al. |
| 6,046,925 A | 4/2000 | Tsien et al. |
| 6,049,727 A | 4/2000 | Crothall |
| 6,057,107 A | 5/2000 | Fulton |
| 6,060,256 A | 5/2000 | Everhart et al. |
| 6,067,167 A | 5/2000 | Atkinson et al. |
| 6,067,392 A | 5/2000 | Wakami et al. |
| 6,078,048 A | 6/2000 | Stevens et al. |
| 6,084,995 A | 7/2000 | Clements et al. |
| 6,087,186 A | 7/2000 | Cargill et al. |
| 6,096,496 A | 8/2000 | Frankel |
| 6,096,596 A | 8/2000 | Gonzalez |
| 6,097,485 A | 8/2000 | Lievan |
| 6,103,535 A | 8/2000 | Pilevar et al. |
| 6,118,127 A | 9/2000 | Liu et al. |
| 6,128,077 A | 10/2000 | Jovin et al. |
| 6,137,931 A | 10/2000 | Ishikawa et al. |
| 6,143,247 A | 11/2000 | Sheppard, Jr. et al. |
| 6,156,501 A | 12/2000 | McGall et al. |
| 6,159,748 A | 12/2000 | Hechinger |
| 6,160,240 A | 12/2000 | Momma et al. |
| 6,160,656 A | 12/2000 | Mossberg et al. |
| 6,164,548 A | 12/2000 | Curiel |
| 6,165,592 A | 12/2000 | Berger et al. |
| 6,165,648 A | 12/2000 | Colvin et al. |
| 6,174,648 B1 | 1/2001 | Terao et al. |
| 6,194,563 B1 | 2/2001 | Cruickshank |
| 6,204,969 B1 | 3/2001 | Jang |
| 6,214,560 B1 | 4/2001 | Yguerabide et al. |
| 6,218,194 B1 | 4/2001 | Lyndin et al. |
| 6,221,579 B1 | 4/2001 | Everhart et al. |
| 6,229,635 B1 | 5/2001 | Wulf |
| 6,229,827 B1 | 5/2001 | Fernald et al. |
| 6,229,941 B1 | 5/2001 | Yoon et al. |
| 6,242,056 B1 | 6/2001 | Spencer et al. |
| 6,259,450 B1 | 7/2001 | Chiabrera et al. |
| 6,268,128 B1 | 7/2001 | Collins et al. |
| 6,277,628 B1 | 8/2001 | Johann et al. |
| 6,284,459 B1 | 9/2001 | Nova et al. |
| 6,285,806 B1 | 9/2001 | Kersey et al. |
| 6,288,220 B1 | 9/2001 | Kambara et al. |
| 6,292,282 B1 | 9/2001 | Mossberg et al. |
| 6,292,319 B1 | 9/2001 | Thomas, III |
| 6,301,047 B1 | 10/2001 | Hoshino et al. |
| 6,304,263 B1 | 10/2001 | Chiabrera et al. |
| 6,306,587 B1 | 10/2001 | Royer et al. |
| 6,309,601 B1 | 10/2001 | Juncosa et al. |
| 6,312,961 B1 | 11/2001 | Voirin et al. |
| 6,313,771 B1 | 11/2001 | Munroe et al. |
| 6,314,220 B1 | 11/2001 | Mossberg et al. |
| 6,319,668 B1 | 11/2001 | Nova et al. |
| 6,321,007 B1 * | 11/2001 | Sanders ............... 385/37 |
| 6,322,932 B1 | 11/2001 | Colvin et al. |
| RE37,473 E | 12/2001 | Challener |
| 6,329,963 B1 | 12/2001 | Chiabrera et al. |
| 6,331,273 B1 | 12/2001 | Nova et al. |
| 6,340,588 B1 | 1/2002 | Nova et al. |
| 6,352,854 B1 | 3/2002 | Nova et al. |
| 6,355,198 B1 | 3/2002 | Kim et al. |
| 6,355,432 B1 | 3/2002 | Fodor et al. |
| 6,356,681 B1 | 3/2002 | Chen et al. |
| 6,359,734 B1 | 3/2002 | Staub et al. |
| 6,361,958 B1 | 3/2002 | Shieh et al. |
| 6,363,097 B1 | 3/2002 | Linke et al. |
| 6,371,370 B2 | 4/2002 | Sadler et al. |
| 6,372,428 B1 | 4/2002 | Nova et al. |
| 6,383,754 B1 | 5/2002 | Kaufman et al. |
| 6,391,562 B2 | 5/2002 | Kambara et al. |
| 6,395,558 B1 | 5/2002 | Duveneck et al. |
| 6,399,295 B1 | 6/2002 | Kaylor et al. |
| 6,399,935 B1 | 6/2002 | Jovin et al. |
| 6,403,320 B1 | 6/2002 | Read et al. |
| 6,404,966 B1 * | 6/2002 | Kawanishi et al. ........ 385/125 |
| 6,406,841 B1 | 6/2002 | Lee et al. |
| 6,406,848 B1 | 6/2002 | Bridgham et al. |
| 6,416,714 B1 | 7/2002 | Nova et al. |
| 6,416,952 B1 | 7/2002 | Pirrung et al. |
| 6,417,010 B1 | 7/2002 | Cargill et al. |
| 6,428,707 B1 | 8/2002 | Berg et al. |
| 6,428,957 B1 | 8/2002 | Delenstarr |
| 6,429,022 B1 | 8/2002 | Kunz et al. |
| 6,433,849 B1 | 8/2002 | Lowe |
| 6,436,651 B1 | 8/2002 | Everhart et al. |
| 6,440,667 B1 | 8/2002 | Fodor et al. |
| 6,456,762 B1 | 9/2002 | Nishiki et al. |
| RE37,891 E | 10/2002 | Collins et al. |
| 6,462,770 B1 | 10/2002 | Cline et al. |
| 6,489,606 B1 | 12/2002 | Kersey et al. |
| 6,496,287 B1 | 12/2002 | Seiberle et al. |
| 6,506,342 B1 | 1/2003 | Frankel |
| 6,515,753 B2 | 2/2003 | Maher et al. |
| 6,522,406 B1 | 2/2003 | Rovira et al. |
| 6,524,793 B1 | 2/2003 | Chandler et al. |
| 6,533,183 B2 | 3/2003 | Aasmul et al. |
| 6,542,673 B1 * | 4/2003 | Holter et al. ............ 385/52 |
| 6,544,739 B1 | 4/2003 | Fodor et al. |
| 6,545,758 B1 | 4/2003 | Sandstrom |
| 6,560,017 B1 | 5/2003 | Bianco |
| 6,565,770 B1 | 5/2003 | Mayer et al. |
| 6,576,424 B2 | 6/2003 | Fodor et al. |
| 6,578,712 B2 | 6/2003 | Lawandy |
| 6,592,036 B2 | 7/2003 | Sadler et al. |
| 6,594,421 B1 | 7/2003 | Johnson et al. |
| 6,609,728 B1 | 8/2003 | Voerman et al. |
| 6,613,581 B1 | 9/2003 | Wada et al. |
| 6,618,342 B1 | 9/2003 | Johnson et al. |
| 6,622,916 B1 | 9/2003 | Bianco |
| 6,628,439 B2 | 9/2003 | Shiozawa et al. |
| 6,632,655 B1 | 10/2003 | Mehta et al. |
| 6,635,470 B1 | 10/2003 | Vann |
| 6,635,863 B1 | 10/2003 | Nihommori et al. |
| 6,646,243 B2 | 11/2003 | Pirrung et al. |
| 6,657,758 B1 | 12/2003 | Garner |
| 6,660,147 B1 | 12/2003 | Woudenberg et al. |
| 6,678,429 B1 | 1/2004 | Mossberg et al. |
| RE38,430 E | 2/2004 | Rosenstein |
| 6,689,316 B1 | 2/2004 | Blyth et al. |
| 6,692,031 B2 | 2/2004 | McGrew |
| 6,692,912 B1 | 2/2004 | Boles et al. |
| 6,874,639 B2 | 4/2005 | Lawandy |
| 6,881,789 B2 | 4/2005 | Bosse |
| 6,892,001 B2 | 5/2005 | Ohta et al. |
| 6,905,885 B2 | 6/2005 | Colston et al. |
| 6,908,737 B2 | 6/2005 | Ravkin et al. |
| 6,982,996 B1 | 1/2006 | Putnam et al. |
| 7,092,160 B2 | 8/2006 | Putnam et al. |
| 7,106,513 B2 | 9/2006 | Moon et al. |
| 7,126,755 B2 | 10/2006 | Moon et al. |
| 2001/0007775 A1 | 7/2001 | Seul et al. |
| 2001/0026667 A1 * | 10/2001 | Kawanishi et al. ........ 385/125 |

| | | | | | | |
|---|---|---|---|---|---|---|
| 2002/0000471 A1 | 1/2002 | Aasmul et al. | | GB | 2 372 100 | 8/2002 |
| 2002/0006664 A1 | 1/2002 | Sabatini | | JP | 08102544 | 4/1986 |
| 2002/0022273 A1 | 2/2002 | Empedocles et al. | | JP | 01047950 | 2/1989 |
| 2002/0025534 A1 | 2/2002 | Goh et al. | | JP | 10166075 | 6/1998 |
| 2002/0034747 A1 | 3/2002 | Bruchez et al. | | JP | 11-119029 | 4/1999 |
| 2002/0039732 A1 | 4/2002 | Bruchez et al. | | JP | 2000-035521 | 2/2000 |
| 2002/0074513 A1 | 6/2002 | Abel et al. | | JP | 2000035521 A * | 2/2000 |
| 2002/0084329 A1 | 7/2002 | Kaye et al. | | JP | 00249706 | 9/2000 |
| 2002/0090650 A1 | 7/2002 | Empedocles et al. | | WO | WO 91/06496 | 5/1991 |
| 2002/0094528 A1 | 7/2002 | Salafsky | | WO | WO 93/09668 | 5/1993 |
| 2002/0097658 A1 | 7/2002 | Worthington | | WO | WO 94/28119 | 12/1994 |
| 2002/0155490 A1 | 10/2002 | Skinner et al. | | WO | WO 96/24061 | 8/1996 |
| 2003/0008323 A1 | 1/2003 | Ravkin et al. | | WO | WO 96/36436 A1 | 11/1996 |
| 2003/0021003 A1 | 1/2003 | Ono et al. | | WO | WO 97/12680 | 4/1997 |
| 2003/0032203 A1 | 2/2003 | Sabatini et al. | | WO | WO 97/15690 | 5/1997 |
| 2003/0077038 A1 | 4/2003 | Murashima et al. | | WO | WO 97/17258 | 5/1997 |
| 2003/0082587 A1 | 5/2003 | Seul et al. | | WO | WO 97/31282 | 8/1997 |
| 2003/0129654 A1 | 7/2003 | Ravkin et al. | | WO | WO 97/34171 | 9/1997 |
| 2003/0138208 A1 | 7/2003 | Pawlak et al. | | WO | WO 98/04740 | 2/1998 |
| 2003/0142704 A1 | 7/2003 | Lawandy | | WO | WO 98/24549 | 6/1998 |
| 2003/0142713 A1 | 7/2003 | Lawandy | | WO | WO 99/02266 | 1/1999 |
| 2003/0153006 A1 | 8/2003 | Washizu et al. | | WO | WO 99/09042 | 2/1999 |
| 2003/0162296 A1 | 8/2003 | Lawandy | | WO | WO 99/32654 | 7/1999 |
| 2003/0184730 A1 | 10/2003 | Price | | WO | WO 99/42209 | 8/1999 |
| 2003/0203390 A1 | 10/2003 | Kaye et al. | | WO | WO 00/08443 | 2/2000 |
| 2003/0228610 A1 | 12/2003 | Seul | | WO | WO 00/16893 A2 | 3/2000 |
| 2004/0047030 A1 | 3/2004 | MacAulay | | WO | WO 00/37914 | 6/2000 |
| 2004/0075907 A1 | 4/2004 | Moon et al. | | WO | WO 00/37969 | 6/2000 |
| 2004/0100636 A1 | 5/2004 | Somekh et al. | | WO | WO 00/39617 | 7/2000 |
| 2004/0125370 A1 | 7/2004 | Montagu | | WO | WO 00/61198 | 10/2000 |
| 2004/0125424 A1 | 7/2004 | Moon et al. | | WO | WO 01/58583 A1 | 8/2001 |
| 2004/0126875 A1 | 7/2004 | Putnam | | WO | WO 01/71322 A2 | 9/2001 |
| 2004/0132205 A1 | 7/2004 | Moon et al. | | WO | WO-01/78889 | 10/2001 |
| 2004/0170356 A1 | 9/2004 | Iazikov et al. | | WO | WO 01/78889 A2 | 10/2001 |
| 2004/0175842 A1 | 9/2004 | Roitman et al. | | WO | WO 01/90225 | 11/2001 |
| 2004/0209376 A1 | 10/2004 | Natan et al. | | WO | WO 02/059306 A2 | 8/2002 |
| 2004/0233485 A1 | 11/2004 | Moon | | WO | WO-02/59306 A2 | 8/2002 |
| 2004/0263923 A1 | 12/2004 | Moon et al. | | WO | WO 03/061983 | 7/2003 |
| 2005/0042764 A1 | 2/2005 | Sailor et al. | | WO | WO 2004/019276 A1 | 3/2004 |
| 2005/0220408 A1 | 10/2005 | Putnam | | WO | WO 2004/024328 | 3/2004 |
| 2005/0227252 A1 | 10/2005 | Moon et al. | | WO | WO 2004/025561 | 3/2004 |
| 2005/0270603 A1 | 12/2005 | Putnam et al. | | WO | WO 2004/025562 | 3/2004 |
| 2006/0023310 A1 | 2/2006 | Putnam et al. | | WO | WO 2004/025563 A1 | 3/2004 |
| 2006/0028727 A1 | 2/2006 | Moon et al. | | WO | WO 2004/066210 | 8/2004 |
| 2006/0057729 A1 | 3/2006 | Moon et al. | | WO | WO 2005/026729 A3 | 3/2005 |
| 2006/0063271 A1 | 3/2006 | Putnam et al. | | WO | WO 2005/027031 A2 | 3/2005 |
| 2006/0071075 A1 | 4/2006 | Moon et al. | | WO | WO 2005/029047 A2 | 3/2005 |
| 2006/0072177 A1 | 4/2006 | Putnam et al. | | WO | WO 2005/033681 A1 | 4/2005 |
| 2006/0118630 A1 | 6/2006 | Kersey et al. | | WO | WO 2005/050207 A3 | 6/2005 |
| 2006/0119913 A1 | 6/2006 | Moon | | WO | WO 2005/079544 A2 | 9/2005 |
| 2006/0132877 A1 | 6/2006 | Kersey | | WO | WO 2006/020363 A2 | 2/2006 |
| 2006/0134324 A1 | 6/2006 | Putnam et al. | | WO | WO 2006/055735 A2 | 5/2006 |
| 2006/0139635 A1 | 6/2006 | Kersey et al. | | WO | WO 2006/055736 A1 | 5/2006 |
| 2006/0160208 A1 | 7/2006 | Putnam et al. | | WO | WO 2006/076053 A1 | 7/2006 |
| 2007/0121181 A1 | 5/2007 | Moon et al. | | | | |

FOREIGN PATENT DOCUMENTS

| | | |
|---|---|---|
| DE | 2416652 | 10/1975 |
| EP | 0 395 300 | 10/1990 |
| EP | 0 723 149 | 7/1996 |
| EP | 0 798 573 A1 | 10/1997 |
| EP | 0 911 667 A1 | 4/1999 |
| EP | 0 916 981 | 5/1999 |
| EP | 0 972 817 A1 | 1/2000 |
| EP | 1 182 054 A2 | 2/2002 |
| EP | 1 219 979 A1 | 7/2002 |
| GB | 2 118 189 | 10/1983 |
| GB | 2 129 551 | 5/1984 |
| GB | 2 138 821 | 10/1984 |
| GB | 2 299 235 | 9/1996 |
| GB | 2 306 484 | 5/1997 |
| GB | 2 319 838 | 6/1998 |

OTHER PUBLICATIONS

Vander Lugt; "Design Relationships For Holographic Memories"; Applied Optics, vol. 12, No. 7, Jul. 1973; pp. 1675-1685.

Andrew Marshall; "DNA Chips: Array of Possibilities"; Nature Biotechnology vol. 16 Jan. 1998; pp. 27-31.

Thomas Laurell; "Enhanced Enzyme Activity in Silicon Integrated Enzyme Reactors Utilizing Porous Silicon as the Coupling Matrix"; Sensor & Actuators B 31 (1996); pp. 161-166.

Michael J. Kozal; "Extensive Polymorphisms Observed in HIV-1 Clade B Protease Gene Using High-Density Oligonucleotide Arrays"; Nature Medicine, vol. 2, No. 7, Jul. 1996; pp. 753-759.

Masato Mitsuhashi; "Gene Manipulation on Plastic Plates"; Nature, vol. 357, Jun. 11, 1992; pp. 519-520.

"Ben Beune Patent Licensing Director of Philips IP&S"; Replication & Duplication -News & Technology; Jan.-Feb. 2002; pp. 1-2.

"Compact Disc Arrayer"; V&P Scientific; Nov. 17, 2003; pp. 1-4.

De Beer et al., "Foward-Scattering Degenerate Four-Wave Mixing for Sensitive Absorption Detection in Microseparation Systems Coupling to Micro-Column Liquid Chromatography"; Journal of Chromatography A. 811 (1998); pp. 35-45.

Fonjallaz et al., "Interferometric Side Diffraction Technique for the Characterisation of Fiber Gratings"; 1999 OSA Conference, Sep. 23-25; 3 pgs.

Kashyap R.; "Fiber Bragg Gratings"; Academic Press, Ch. 9; pp. 430-433.

Kogelnik H; "Coupled Wave Theory for Thick Hologram Gratings"; The Bell System Technical Journal, 48(9):2909-2947 (1969).

Krug P., "Measurement of index Modulation Along an Optical Fiber Bragg Grating"; Optics Letters, 20(17):1767-1769.

Leith et al., "Holographic Data Storage in Three-Dimensional Media"; Applied Optics, vol. 5, No. 8, Aug. 1966; 21 pgs.

Shelia R. Nicerwarner-Peña, "Submicrometer Metallic Barcodes"; Science, vol. 294; Oct. 5, 2001; 5 pgs.

Ivan Oransky; "Sequencing on Compact Disc? Microgenomics of Breast Cancer; Better Binding Site Prediction"; vol. 17 / Issue 13 / 35 / Jun. 30, 2003; 13 pgs.

Mark O. Worthington; "Cirriculum Vitae"; Jan. 5, 2004; 4 pgs.

Yoshinobu Kohara; "DNA Probes on Beads Arrayed in a Capillary, 'Bead-Array', Exhibited High Hybridization Performance"; Nucleic Acids Research, 2002, vol. 30, No. 16 e87; 7 pgs.

Jain KK, Nanodiagnostics: application of nanotechnology in molecular diagnostics, Expert Review of Molecular Diagnostics 3 (2):153-161 (2003), XP008038849.

Othonos, X. Lee; Superimposed Multiple Bragg Gratings, Nov. 10, 1994, vol. 30, No. 23.

Po Ki Yuen, Microbarcode Sorting Device; Science & Technology, Corning Incorparated, Corning, New York 14831-0007, USA.

International Search Report and Preliminary Examination Report for International Application No. PCT/US2003/26315.

International Search Report and Written Opinion for International Application No. PCT/US2003/26316.

International Search Report for International Application No. PCT/US2003/28862.

International Search Report for International Application No. PCT/US2003/28874.

International Search Report for International Application No. PCT/US2003/28875.

International Search Report for International Application No. PCT/US2003/28887.

International Search Report for International Application No. PCT/US2003/28890.

International Search Report and Preliminary Examinatoin for International Application No. PCT/US2003/29164.

International Search Report for International Application No. PCT/US2003/29244.

International Search Report and Written Opinion for International Application No. PCT/US2004/01685.

International Search Report and Written Opinion for International Application No. PCT/US2004/30037.

International Search Report and Written Opinion for International Application No. PCT/US2004/30038.

International Search Report and Written Opinion for International Application No. PCT/US2004/30300.

International Search Report and Written Opinion for International Application No. PCT/US2004/32084.

International Search Report and Written Opinion for International Application No. PCT/US2004/38416.

International Search Report and Written Opinion for International Application No. PCT/US2005/05743.

International Search Report and Written Opinion for International Application No. PCT/US2005/05745.

International Search Report and Written Opinion for International Application No. PCT/US2005/26289.

International Search Report and Written Opinion for International Application No. PCT/US2005/33694.

International Search Report and Written Opinion for International Application No. PCT/US2005/41730.

International Search Report and Written Opinion for International Application No. PCT/US2005/41731.

"Electronically Scanned Confocal Imaging System"; IBM Technical Disclosure Bulletin; vol. 36; No. 06B; Jun. 1993; pp. 261-262.

Hideki Kambara; Recent Progress In fluorescent DNA Analyzers and Methods; Current Topics in Analytical checmistry; vol. 1, (1998) pp. 21-36.

G. Kakarantzas et al.;"Transmission Filters Based on periodically Micro-tapered Fibre"; CLE0/2000/Friday Morning; 8:45 a.m.; pp. 574-575.

Michael C. Needels et al.; "Generation and Screening of an Oligonucleotide-Encoded Synthetic Peptide Library"; Proc Natl. Acad. Sci. USA, vol. 90;pp. 10700-10704, Nov. 1993.

W.R. Rigby; "An Anodizing Process for the Production of Inorganic Microfiltration Membranes"; 2436 Transactions of the Institute of Metal Finishing;68Aug. 1990.,Part 3 p. 95-98.

* cited by examiner

Range of angles for Bragg envelope measurement

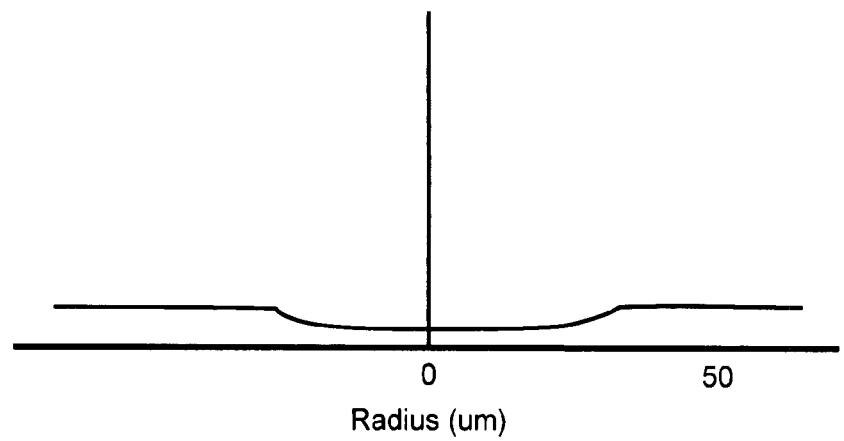
FIG. 4(b)
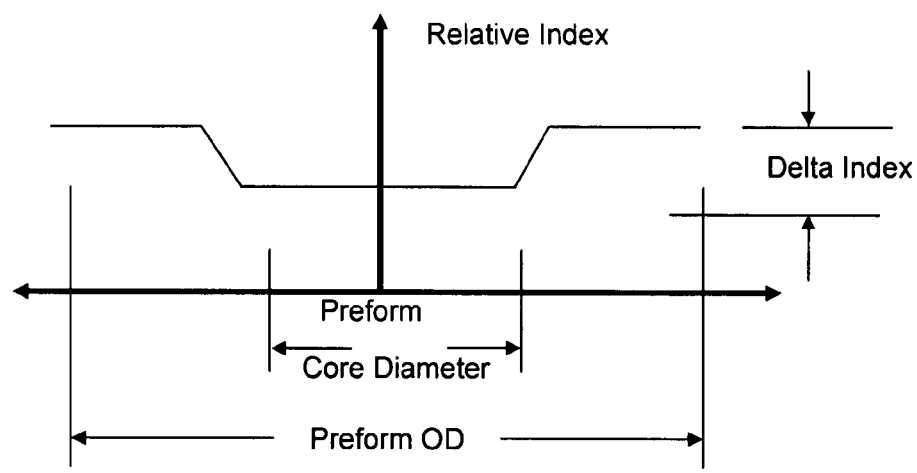
Figure 10: Preform Refractive Index Profile

OPTICAL IDENTIFICATION ELEMENT HAVING NON-WAVEGUIDE PHOTOSENSITIVE SUBSTRATE WITH DIFFRACTION GRATING THEREIN

CROSS REFERENCES TO RELATED APPLICATIONS

This application relates and claims benefit to the following U.S. provisional patent application Ser. No. 60/546,445 (CV-0035PR), entitled "Optical Identification Element Having Non-Waveguide Photosensitive Substrate With Bragg Grating Therein", filed Feb. 19, 2004, which is hereby incorporated by reference in its entirety.

This application also relates to U.S. provisional patent application Ser. Nos. 60/546,435 (CV-0053PR), entitled "Multi-Well Plate With Alignment Grooves for Encoded Microparticles"; and 60/547,013 (CV-0065PR), entitled "Optical Identification Element Using Separate or Partially Overlapping Diffraction Gratings", all filed Feb. 19, 2004 and hereby incorporated by reference in their entirety, as well as 11/063,665(CV-0053US), entitled "Multi-Well Plate With Alignment Grooves for Encoded Microparticles", and 11/063,666, (CV-0065US), entitled "Optical Identification Element Using Separate or Partially Overlapping Diffraction Gratings", and PCTUS/2005005745 "Optical Identification Element Using Separate of Partially Overlapping Diffraction Bratings" all filed Feb. 22, 2005 contemporaneously with the instant application and all also hereby incorporated by reference in their entirety.

The following cases contain subject matter related to that disclosed herein and are incorporated herein by reference in their entirety: U.S. Provisional Patent Application Ser. No. 60/441,678, filed Jan. 22, 2003, entitled "Hybrid Random Bead/Chip Microarray", U.S. patent application Ser. No. 10/645,689, filed Aug. 20, 2003, entitled "Diffraction Grating-Based Optical Identification Element", U.S. patent application Ser. No. 10/645,686 filed Aug. 20, 2003, entitled "End Illuminated Bragg Grating based Optical Identification Element", U.S. patent application Ser. No. 10/661,234, filed Sep. 12, 2003, entitled "Diffraction Grating-Based Optical Identification Element", U.S. patent application Ser. No. 10/661, 031, filed Sep. 12, 2003, entitled "End Illuminated Bragg Grating based Optical Identification Element", U.S. patent application Ser. No. 10/661,082, filed Sep. 12, 2003, entitled "Method and Apparatus for Labeling Using Diffraction Grating-based Encoded Optical Identification Elements", U.S. patent application Ser. No. 10/661,115, filed Sep. 12, 2003, entitled "Assay Stick", U.S. patent application Ser. No. 10/661,836, filed Sep. 12, 2003, entitled "Method and Apparatus for Aligning Microbeads in order to Interrogate the Same", U.S. patent application Ser. No. 10/661,254 filed Sep. 12, 2003, entitled "Chemical Synthesis Using Diffraction Grating-based Encoded Optical Elements", U.S. patent application Ser. No. 10/661,116 filed Sep. 12, 2003, entitled "Method of Manufacturing of a Diffraction grating-based identification Element", U.S. Provisional patent application Ser. No. 60/519,932, filed Nov. 14, 2003, entitled, "Diffraction Grating-Based Encoded Microparticles for Multiplexed Experiments", and U.S. patent application Ser. No. 10/763, 995 filed Jan. 22, 2004, entitled, "Hybrid Random bead/chip based microarray".

BACKGROUND OF INVENTION

1. Technical Field

The present invention relates to an identification element, and more particularly to an optical identification element having a diffraction grating written therein.

2. Description of Related Art

Many industries have a need for uniquely identifiable objects or for the ability to uniquely identify objects, for sorting, tracking, and/or identification/tagging. Existing technologies, such as bar codes, electronic microchips/transponders, radio-frequency identification (RFID), and fluorescence and other optical techniques, are often inadequate. For example, existing technologies may be too large for certain applications, may not provide enough different codes, or cannot withstand harsh temperature, chemical, nuclear and/or electromagnetic environments. Therefore, it would be desirable to obtain a coding element or platform that provides the capability of providing many codes (e.g., greater than 1 million codes), that can be made very small, and/or that can withstand harsh environments.

SUMMARY OF INVENTION

In its broadest sense, the present invention provides a new and unique optical identification element (also known herein as a microbead) made from pieces of an optical fiber or substrate that includes an inner core or region being surrounded by an outer cladding region, the optical fiber or substrate having an identification code imparted therein containing coded information. The identification code may be in the form of a Bragg grating inscribed or written in either the inner core or outer cladding.

The optical identification element may be microscopic in size having a length in a range of 1-1,000 microns or smaller; or for larger applications may have a length of 1.0-1,000 millimeters or more. The outer diameter may be as small as less than 1,000 microns, as well as in a range of 1.0 to 1,000 millimeters for larger applications. Using manufacturing techniques developed in conjunction with the development of the present invention, one optical fiber or substrate can be drawn and processed to produce hundreds of thousands, as well as even a million or more of such unique microbeads.

Microbead Using Conventional Waveguide Technology

In one embodiment, the optical identification element may be manufactured from a conventional waveguide used in the telecommunications industry in which the refractive index of the core is higher than the cladding using, for example, the technique shown and described in patent application Ser. No. 10/661,234 (CC/CV-0648A/0039A), which is hereby incorporated by reference, as well as other techniques described below. In this case, the Bragg grating is written in the core of the conventional waveguide.

In this embodiment, conventional waveguides are used that are known in the art and used in the telecommunications industry, which are made from optical fiber (e.g. 125 micron optical fiber). Conventional fiber Bragg gratings are primarily formed in single mode fibers and are used for coupling forward propagating modes into backward propagating modes. The coupled modes are confined to propagate in the core region of the fiber along its axis; such a constraint defines a waveguide. If only one mode is allowed to propagate then the fiber is called a single mode waveguide, if two or more modes are permitted to propagate the fiber is referred to as a multi-mode waveguide. The key to the function of guiding any number of modes in a fiber is the existence of both a core region and a cladding region, where the refractive index of the core is higher than the cladding. Conditions for single mode propagation are met when the V number of the fiber is less than 2.405, larger values will result in more than one mode. The V number is related to the geometry and refractive indices of the core and clad by the following relationship:

$$V := \frac{2\pi \cdot a \cdot NA}{\lambda c} \qquad NA := \sqrt{n1^2 - n2^2}$$

where n1 and n2 are the refractive indices of the core and clad respectively. Practical single mode fibers are restricted to NA's in the range of 0.05 to 0.3. Fibers on the high end of the NA range have extremely small core diameters, ranging from 1 to 3 microns, while fibers on the low end of the range have larger cores, but their sensitivity to bend loss increases substantially. As the NA approaches zero, the fiber behaves less and less like a waveguide, which is inconsistent with the stringent demands of the telecommunications industry.

The broad list of devices and applications of fiber Bragg gratings has thus far been restricted to operation in single or few moded fibers; these include band pass optical filters, strain sensors, dispersion compensators, and gain flattening filters. In addition to the technique shown and described in patent application Ser. No. 10/661,234 (CC/CV-0648A/0039A), the following list includes United States patents disclosing techniques for forming Bragg gratings in a conventional telecommunications waveguide:

1. U.S. Pat. No. 5,367,588—Method of fabricating Bragg gratings using a silica glass phase grating mask and mask used by same, by Ken Hill;

2. U.S. Pat. No. 5,327,515—Method for forming a Bragg grating in an optical medium, by Dana Anderson; and 3. U.S. Pat. No. 5,351,321—Bragg grating made in optical waveguide, by Elias Snitzer, which are all hereby incorporated by reference.

Microbead Using A New and Unique Optical Substrate

However, using such a conventional telecommunications waveguide to make such optical identification elements may be expensive to manufacture because the manufacturing techniques for making conventional telecommunications waveguides involve drawing optical fiber from a preform under strict predefined optical conditions so as to produce optical fiber having strict predetermined optical characteristics. Moreover, using such a conventional telecommunications waveguide to make such optical identification elements may also be expensive to manufacture because the manufacturing techniques for making such conventional telecommunications waveguides involving writing strong gratings in the optical fiber with grating writing techniques requiring very precise and expensive lasers in order to meet the demands of the telecommunications industry. In view of this, the inventor has also developed an alternative optical identification element in which a substrate is used such as an optical substrate having the refractive index of the core less than or equal to the cladding, that has important advantages in that it is less expensive to manufacture than when using the conventional waveguide technology otherwise used in the telecommunications industry.

In this alternative embodiment, the optical identification element is manufactured using, for example, the technique shown and described in U.S. patent application Ser. No. 10/661,234 (CC/CV-0648A/0039A), as well as other techniques described herein.

Since in a typical usage, the optical identification element is interrogated from the side in order to read the coded information contained in the Bragg grating, the Bragg grating may be written not only in the core, but also in the cladding.

The microbeads in the alternative embodiment can be manufactured using the same process for inscribing Bragg gratings as those described in some of the above patents. Moreover, due to fact that the beads are interrogated from the side, it is not necessary that the optical substrate be manufactured to perform as a conventional waveguide. It is also well known that the incorporation of Boron as a dopant enhances the photosensitivity of the optical substrate to UV radiation. Boron is also known as an index depressor when it is incorporated into silica glass. When designing a single mode waveguide the amount of Boron is usually very carefully balanced with Germanium to provide the correct index profile in conjunction with enhanced photosensitivity. Again, because the requirement for waveguiding is removed for the microbead applications, excess amounts of Boron can be incorporated into the glass to increase its photosensitivity without regard to its optical guiding properties. This has the benefit of reducing the cost of manufacturing the optical substrate when compared to manufacturing the conventional waveguide, and increasing the photosensitivity without concern for tradeoffs involving other waveguiding issues.

When an optical substrate does not have to perform as a conventional waveguide, the core index of the optical substrate may be made lower than the cladding index. Under these conditions, the above equation demonstrate that the NA is imaginary, and thus the optical substrate is not considered a waveguide.

In the alternative embodiment, the optical identification element is a non-waveguide optical substrate having the Bragg grating inscribed therein. The optical identification element structure consists of a photosensitive region in the geometric center of the element surrounded by a non-photosensitive and non-absorbing region. The photosensitive region has an index of refraction less than or equal to the surrounding region, thus preventing the element from supporting any modes. The photosensitive region is also designed to produce the appropriate Bragg envelope when interrogated from the side. Bragg envelopes in the range of 1 to 10 degrees are desirable for most microbead applications. In order to achieve such an envelope with visible light, the diameter of the photosensitive region must be no larger than 30 um, and for most applications the ideal size is approximately 12 um. Due to this small size and the practical issues that would arise from fabricating and handing such a small optical identification element, it is convenient to include an outer region, which is neither photosensitive nor absorbing, which has an outer diameter between 50-130 um. The optical identification element had a core diameter of 24 um when the outer diameter was 125 um, and a core diameter of 12 um when it was drawn to 65 um in diameter. The index of the core region was −0.003, thus ensuring the optical identification element would not guide a mode.

The New and Unique Optical Substrate Specification

The new and unique optical substrate may take the form of a photosensitive non-waveguide optical fiber consisting of two sections, an outer section and at least one inner section. The outer section (or cladding) is made entirely of fused silica, without any dopants; however, trace amounts of impurities commonly found in fused silica or natural fused quartz are acceptable. The inner section (or core) is made of Germanium and Boron doped fused silica. The exact constituents of Boron and Germanium are determined based on the desired refractive index profile (RIP). In one example, the photosensitive non-waveguide optical fiber may have an outer diameter of 28 um±1 um, and the inner section diameter of 8 um±0.5 um. The scope of the invention is intended to include using other dimensions as well.

The photosensitive non-waveguide optical fiber may be made by drawing a glass preform on a known fiber draw tower. Also, the photosensitive non-waveguide optical fiber may be drawn with an outer coating or buffer layer to protect the fiber during handling, e.g., a polymer based coating or other coating.

The RIP of the preform is used to calculate the following parameters of the photosensitive non-waveguide optical fiber as follows:

Fiber Core Diameter=(Fiber Outer Diameter)/Ratio,
where Ratio=(Preform Outer Diameter)/(Preform Core Diameter); the Ratio stays the same for the Preform and the Fiber.

Measurements are typically taken along the length of the preform in intervals of about 1 cm; however, other intervals may be used if desired. The Delta refractive index (or Delta Index) between the outer cladding and the inner core is typically defined as the difference: Clad index—Core index. In one example, the Delta Index may be greater than 0.001 as measured from the preform RIP (and as will also exist in the fiber). Other values for the Delta Index may be used if desired.

The elemental (or dopant) constituents (Germanium and Boron dopants) in the core may be about 20 mole % Germanium (Ge) and about 10 mole % Boron (B). Other percentages of the dopants may be used if desired. The Germanium helps increase photosensitivity and the Boron reduces the refractive index to create the depressed core shape of the fiber refractive index profile. Other values of Ge and B may be used provided the inner core region has a refractive index that is less than the outer cladding region ("depressed core"). Also, other dopant(s) now known or later developed may be used to create the depressed core substrate. Also, instead of depressing the refractive index of the core, the refractive index of the cladding may be increased to create the desired depressed core condition. In such a depressed core condition, light will not be guided along the inner core region because it does not satisfy the well known waveguide condition; thus, the substrate does not act as a waveguide. Furthermore, the substrate will not propagate light along the core that could be reflected or diffracted by a diffraction grating located in the substrate.

As discussed herein, the substrate may be photosensitive to impress the diffraction grating therein. In that case, the fiber inner region (or core) has a photosensitivity that allows for a refractive index modulation of greater than about $5 \times 10^{-4}$, using approximately 248 nanometer (nm) light, and about 0.5 Joules/cm$^2$. Other levels of photosensitivity may be used, provided it is sufficient to give the desired grating profile. The photosensitivity may be achieved by any technique now known or later developed that allows the region of the substrate where the diffraction grating is to be written to experience a change in the refractive index of the substrate material when exposed to incident radiation of a desired wavelength, e.g., Ultraviolet (UV) exposure or actinic radiation or other wavelength radiation. For example, the fiber may be loaded with Hydrogen ($H_2$) or Deuterium ($D_2$), or doped with lead, boron germanium, flame brushing, tin-germanium or other dopants, such as is described in U.S. Pat. No. 5,287,427 issued to Atkins on Feb. 25, 1994; or U.S. Pat. No. 5,325,659 issued to Atkins et al. on Aug. 10, 1993; or U.S. Pat. No. 5,157,747 issued to Atkins et al. on Oct. 20, 1992; or U.S. Pat. No. 6,221,566 issued to Kohnke et al. on Apr. 24, 2001; or U.S. Pat. No. 6,327,406 issued to Cullen et al. on Dec. 4, 2001; or U.S. Pat. No. 6,097,512 issued to Ainsle et al. on Aug. 1, 2000; or U.S. Pat. No. 6,075,625 issued to Ainsle et al. on Jun. 13, 2000; or U.S. Pat. No. 5,495,548 issued to Hill on Feb. 12,1996; or U.S. Pat. No. 6,436,857 issued to Brubeck et al. on Aug. 20, 2002; or as described in articles by X-C Long et al., entitled "Large Photosensitivity in Lead Silicate Glasses", FE3-1/219 to FE3-3/221; or F. Ouellette et al, *Applied Physics Letters,* Vol. 58(17), p 1813; or G. Meltz et al, SPIE, Vol. 1516, "Int'l Workship on Photoinduced Self-Organization in Optical Fiber", May 10-11, 1991, Quebec City, Canada, pp 1516-1518; or D. McStay, SPIE, Vol. 1314, "Fibre Optics '90", pp.223-233; or as also discussed in the book by Kashyap, entitled "Fiber Bragg Gratings", including Chapter 2, pp 13-54, Academic Press 1999; or as described in the references of one or more of the foregoing documents referred to therein, each of which is hereby incorporated herein by reference in its entirety; or some combination of the aforementioned documents.

While the substrate has been described as being used with a cylindrical fiber geometry, it should be understood and appreciated that other geometries may be used, such as planar, D-shaped, or any other shape, such as is described for example in the aforementioned co-pending co-owned patent applications. Also, when the material is referred to as a photosensitive material it is understood to mean any material whose index of refraction can be changed by exposing the material to light of a predetermined intensity at a wavelength in a predetermined range.

The foregoing and other objects, features and advantages of the present invention will become more apparent in light of the following detailed description of exemplary embodiments thereof, as illustrated in the accompanying drawing.

BRIEF DESCRIPTION OF THE DRAWING

The drawing includes FIGS. 1-10, which are not drawn to scale, and include the following:

FIG. 10 shows a refractive index profile for a preform, showing the delta index in relation to the preform core diameter and the preform outer diameter.

DETAILED DESCRIPTION OF THE INVENTION

Figure 1:
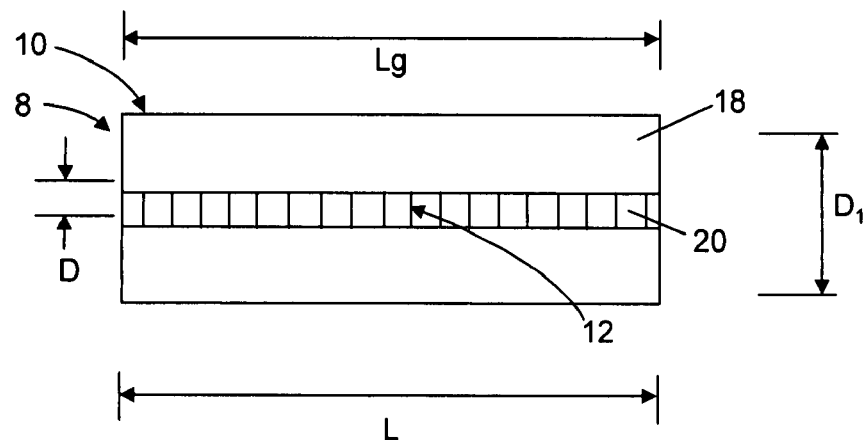
FIG. 1 is a side view of an optical identification element in accordance with the present invention.

FIG. 1: The Basic Invention

Referring to FIG. 1, a diffraction grating-based optical identification element 8 (or encoded element or coded element) comprises a known optical substrate 10, having an optical diffraction grating 12 disposed (or written, impressed, embedded, imprinted, etched, grown, deposited or otherwise formed) in the volume of or on a surface of a substrate 10. The optical identification element 8 described herein is the same as that described in Copending patent application Ser. No. 10/661,234, filed Sep. 12, 2003, which is incorporated herein by reference in its entirety. The grating 12 may have a periodic or aperiodic variation in the effective refractive index and/or effective optical absorption of at least a portion of the substrate 10. It is important to note that the grating shown and described herein is provided by way of example. The scope of the invention is not intended to be limited to the type or kind of grating 12 in the substrate, the type or kind of variations forming the same, or the manner or technique for disposing the grating 12 into the substrate 10. Moreover, the scope of the invention is intended to include gratings and techniques for disposing the same both now known in the art, as well as those developed in the future.

As shown, the substrate 10 has an inner region 20 where the grating 12 is located. The inner region 20 may be photosensitive to allow the writing or impressing of the grating 12. The substrate 10 has an outer region 18, which does not have the grating 12 therein.

The grating 12 is a combination of one or more individual spatial periodic sinusoidal variations (or components) in the refractive index that are collocated at substantially the same location on the substrate 10 along the length of the grating region 20, each having a spatial period (or pitch) $\Lambda$. The resultant combination of these individual pitches is the grating 12, comprising spatial periods ($\Lambda 1$-$\Lambda n$) each representing a bit in the code. Thus, the grating 12 represents a unique optically readable code, made up of bits, where a bit corresponds to a unique pitch $\Lambda$ within the grating 12. Accordingly, for a digital binary (0-1) code, the code is determined by which spatial periods ($\Lambda 1$-$\Lambda n$) exist (or do not exist) in a given composite grating 12. The code or bits may also be determined by additional parameters (or additional degrees of multiplexing), and other numerical bases for the code may be used, as discussed herein and/or in the aforementioned patent application. However, it is important to note that the scope of the invention is not intended to be limited to the type or kind of code represented by the grating 12, or the manner or technique for reading or interpreting the same. Moreover, the scope of the invention is intended to include the grating represent codes, and/or or the manner or technique for reading or interpreting the same, both now known in the art, as well as those developed in the future.

The grating 12 may also be referred to herein as a composite or collocated grating. Also, the grating 12 may be referred to as a "hologram", as the grating 12 transforms, translates, or filters an input optical signal to a predetermined desired optical output pattern or signal.

The substrate 10 has an outer diameter D1 and comprises silica glass ($SiO_2$) having the appropriate chemical composition to allow the grating 12 to be disposed therein or thereon. By way of example, the substrate 10 may be made of any glass, e.g., silica, phosphate glass, borosilicate glass, or other glasses, or made of glass and plastic, or solely plastic; however, other materials for the optical substrate 10 may be used if desired, including materials now known or later developed in the future. For high temperature or harsh chemical applications, the optical substrate 10 made of a glass material is desirable. If a flexible substrate is needed, plastic, rubber or polymer-based substrate may be used. In effect, the optical substrate 10 may be any material capable of having the grating 12 disposed in the grating region 20 and that allows light to pass through it to allow the code to be optically imparted therein and read within the spirit of the invention described herein.

The optical substrate 10 with the grating 12 has a length L and an outer diameter D1, and the inner region 20 diameter D. The length L can range from very small "microbeads" (or microelements, micro-particles, or encoded particles), about 1-1,000 microns or smaller, to larger "macrobeads" or "macroelements" for larger applications (about 1.0-1,000 mm or greater). In addition, the outer dimension D1 can range from small (less than 1,000 microns) to large (1.0-1,000 mm and greater). Other dimensions and lengths for the substrate 10 and the grating 12 may be used within the spirit of the invention described herein.

The grating 12 may have a length Lg of about the length L of the substrate 10. Alternatively, the length Lg of the grating 12 may be shorter than the total length L of the substrate 10. The scope of the invention is not intended to be limited to any particular length Lg of the grating, or the length Lg in relation to the length L of the substrate 10. The outer region 18 is made of pure silica ($SiO_2$) and has a refractive index n2 of about 1.458 (at a wavelength of about 1553 nm), and the inner grating region 20 of the substrate 10 has dopants, such as germanium and/or boron, to provide a refractive index n1 of about 1.453, which is less than that of outer region 18 by about 0.005. Other indices of refraction n1, n2 for the grating region 20 and the outer region 18, respectively, may be used, if desired, provided the grating 12 can be impressed in the desired grating region 20. For example, the grating region 20 may have an index of refraction that is larger than that of the outer region 18 or grating region 20 may have the same index of refraction as the outer region 18 if desired. In other words, the scope of the invention is not intended to be limited to any particular refractive index of the inner or outer region, or the relationship of the refractive indices in relation to one another, or the materials or dopants used to provide the same in these regions, within the spirit of the invention.

Figure 2:
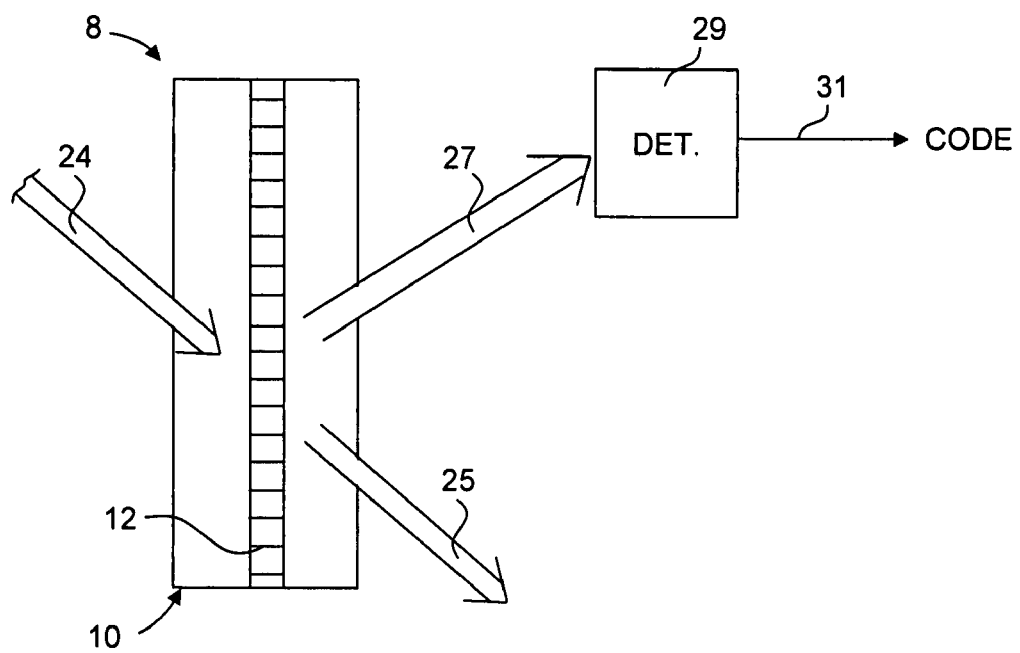
FIG. 2 is a top level optical schematic for reading a code in an optical identification element in accordance with the present invention.

FIG. 2 shows, by way of example, a technique for reading the code in the optical identification element 8. As shown, an incident light 24 of a wavelength $\lambda$, e.g., 532 nm from a known frequency doubled Nd:YAG laser or 632 nm from a known Helium-Neon laser, is incident on the grating 12 in the substrate 10. Any other input wavelength $\lambda$ can be used if desired provided the wavelength $\lambda$ is within the optical transmission range of the substrate (discussed more herein and/or in the aforementioned patent application(s)). A portion of the input light 24 passes straight through the grating 12, as indicated by the arrow 25. The remainder of the input light 24 is reflected by the grating 12, as indicated by the arrow 27 and provided to a detector 29. The output light 27 may be a plurality of beams, each having the same wavelength $\lambda$ as the input wavelength $\lambda$ and each having a different output angle indicative of the pitches ($\Lambda 1$-$\Lambda n$) existing in the grating 12. Alternatively, the input light 24 may be a plurality of wavelengths and the output light 27 may have a plurality of wavelengths indicative of the pitches ($\Lambda 1$-$\Lambda n$) existing in the grating 12. Alternatively, the output light 27 may be a combination of wavelengths and output angles. The above techniques are discussed in more detail herein and/or in the aforementioned patent application. It is important to note that the scope of the invention is not intended to be limited to any particular input wavelength used, or the number of wavelengths used, or the number of beams used, or the angle of the beams used, in the technique for reading the code in the optical identification element 8 within the spirit of the invention.

The detector 29 has the necessary optics, electronics, software and/or firmware to perform the functions described herein. In particular, the detector reads the optical signal 27 diffracted or reflected from the grating 12 and determines the code based on the pitches present or the optical pattern, as discussed more herein or in the aforementioned patent application. An output signal indicative of the code is provided on a line 31. Optical detectors like 29 are known in the art, and the scope of the invention is not intended to be limited to any particular type or kind thereof.

The Grating Writing Process

The diffraction grating(s) 12 may be written or shot, for example, in the manner shown and described in detail in the technique shown and described in the aforementioned patent application Ser. No. 10/661,234 filed Sep. 12, 2003, which is incorporated herein by reference in its entirety. The grating 12 may be impressed in an optical fiber or substrate by any technique for writing, impressed, embedded, imprinted, or otherwise forming a diffraction grating in the volume of or on a surface of a substrate now known or later developed in the future. Examples of some known techniques are disclosed in U.S. Pat. Nos. 4,725,110 and 4,807,950, entitled "Method for Impressing Gratings Within Fiber Optics", issued to Glenn et al; and U.S. Pat. No. 5,388,173, entitled "Method and Apparatus for Forming Aperiodic Gratings in Optical Fibers", issued to Glenn, respectively; and U.S. Pat. No. 5,367,588, entitled "Method of Fabricating Bragg Gratings Using a Silica Glass Phase Grating Mask and Mask Used by Same", issued to Hill; and U.S. Pat. No. 3,916,182, entitled "Periodic Dielectric Waveguide Filter", issued to Dabby et al; and U.S. Pat. No. 3,891,302, entitled "Method of Filtering Modes in Optical Waveguides", also issued to Dabby et al., which are all hereby incorporated herein by reference to the extent necessary to understand the present invention.

Alternatively, instead of the grating 12 being impressed within the fiber material, the grating 12 may be partially or totally created by etching or otherwise altering the outer surface geometry of the substrate to create a corrugated or varying surface geometry of the substrate, such as is disclosed in U.S. Pat. No. 3,891,302, entitled "Method of Filtering Modes in Optical Waveguides", issued to Dabby et al., which is also hereby incorporated herein by reference to the extent necessary to understand the present invention, provided the resultant optical refractive profile for the desired code is created.

Further, alternatively, the grating 12 may be made by depositing dielectric layers onto the substrate, similar to the way a known thin film filter is created, so as to create the desired resultant optical refractive profile for the desired code.

FIG. 3

Figure 3:
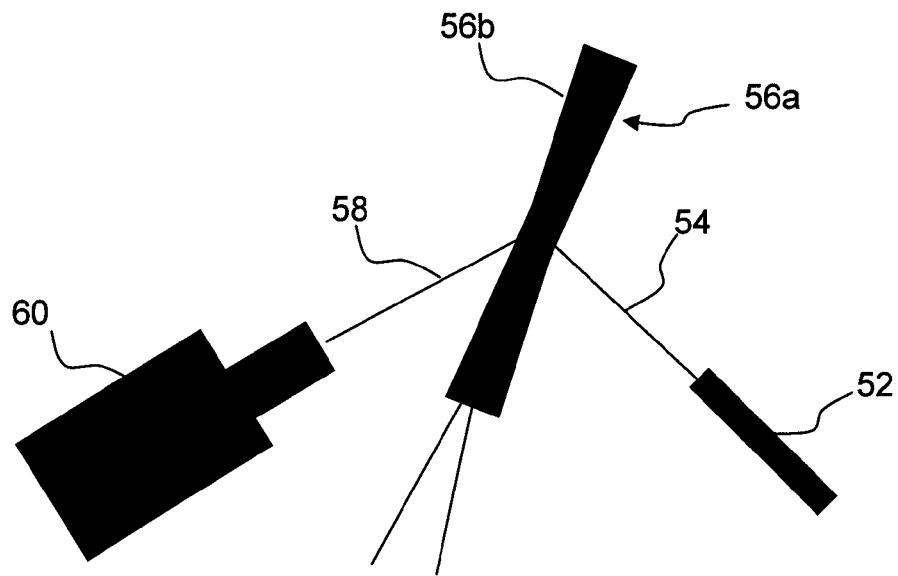
FIG. 3 is a schematic of Bragg grating envelope measurement equipment that may be used to read an optical identification element according to the present invention.

In one experiment, an optical identification element was exposed to 7 collocated gratings and interrogated from the side in the manner described in U.S. patent application Ser. No. 10/661,234 filed Sep. 12, 2003 incorporated herein by reference. Resulting diffracted beams 58 were imaged and read using a CCD camera like device 60 in FIG. 3 and the images were captured and processed using a frame grabber card in a personal computer (PC) or other suitable processing device, not shown. The Bragg envelope for the two optical identification elements were also measured by capturing the images of the diffracted beams for a range of rotation angles. It was found that under normal exposure conditions, the excess Boron in the core provided enhanced photosensitivity over the standard "photosensitive" telecom fiber. FIG. 3 shows the laser 52 providing an input light beam 54 on two elements 56a, 56b, and an output beam 58 being read by the CCD camera 60.

FIG. 4

Figure 4A:
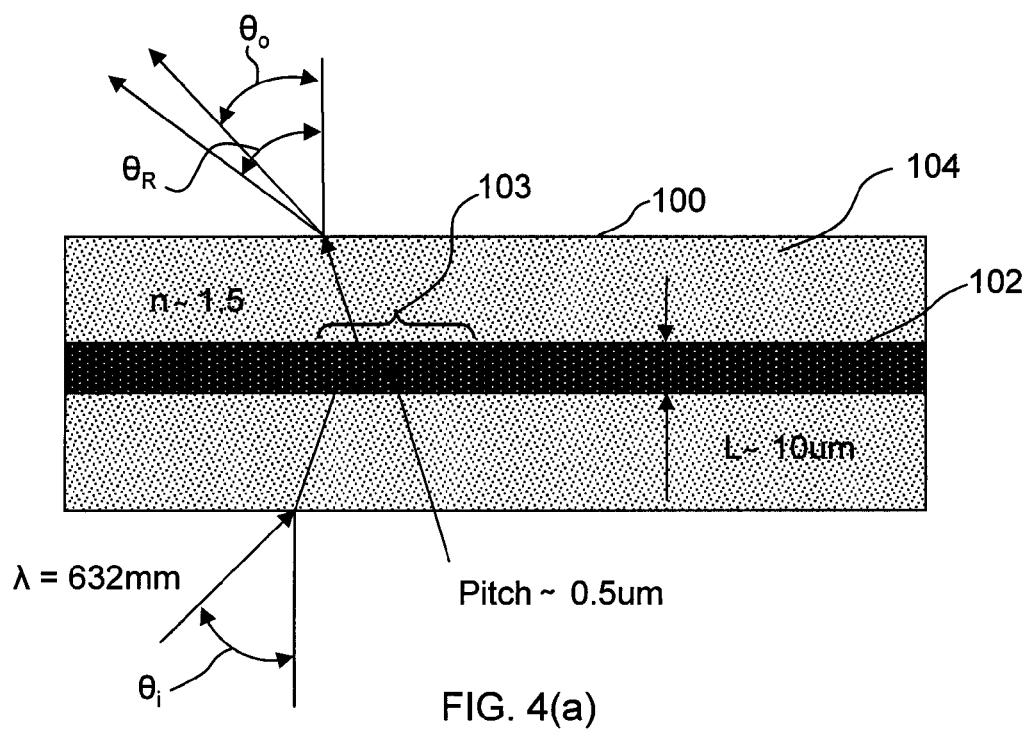
FIG. 4 includes FIG. 4(*a*) which shows a schematic of the fiber geometry of an optical fiber or substrate according to the present invention, and FIG. 4(*b*) which shows the refractive index profile in relation to the radius in microns of the fiber or substrate.
Figure 5:
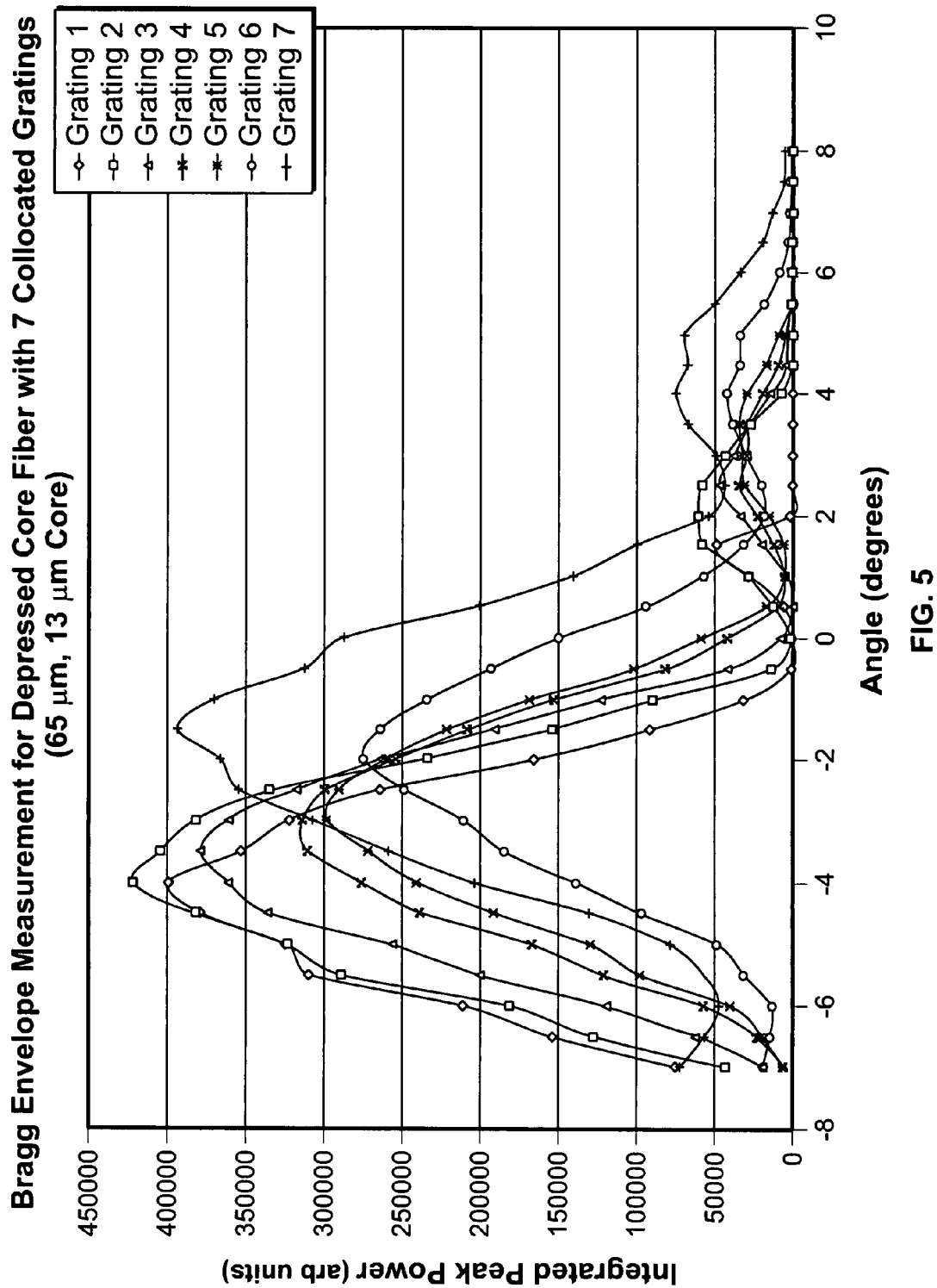
FIG. 5 shows a graph of a Bragg envelope measurement for depressed core fiber with 7 collocated gratings (65 μm, 13 μm core), having the integrated peak power (arbitrary units) plotted in relation to the angle (degrees) of incidence.
Figure 6:
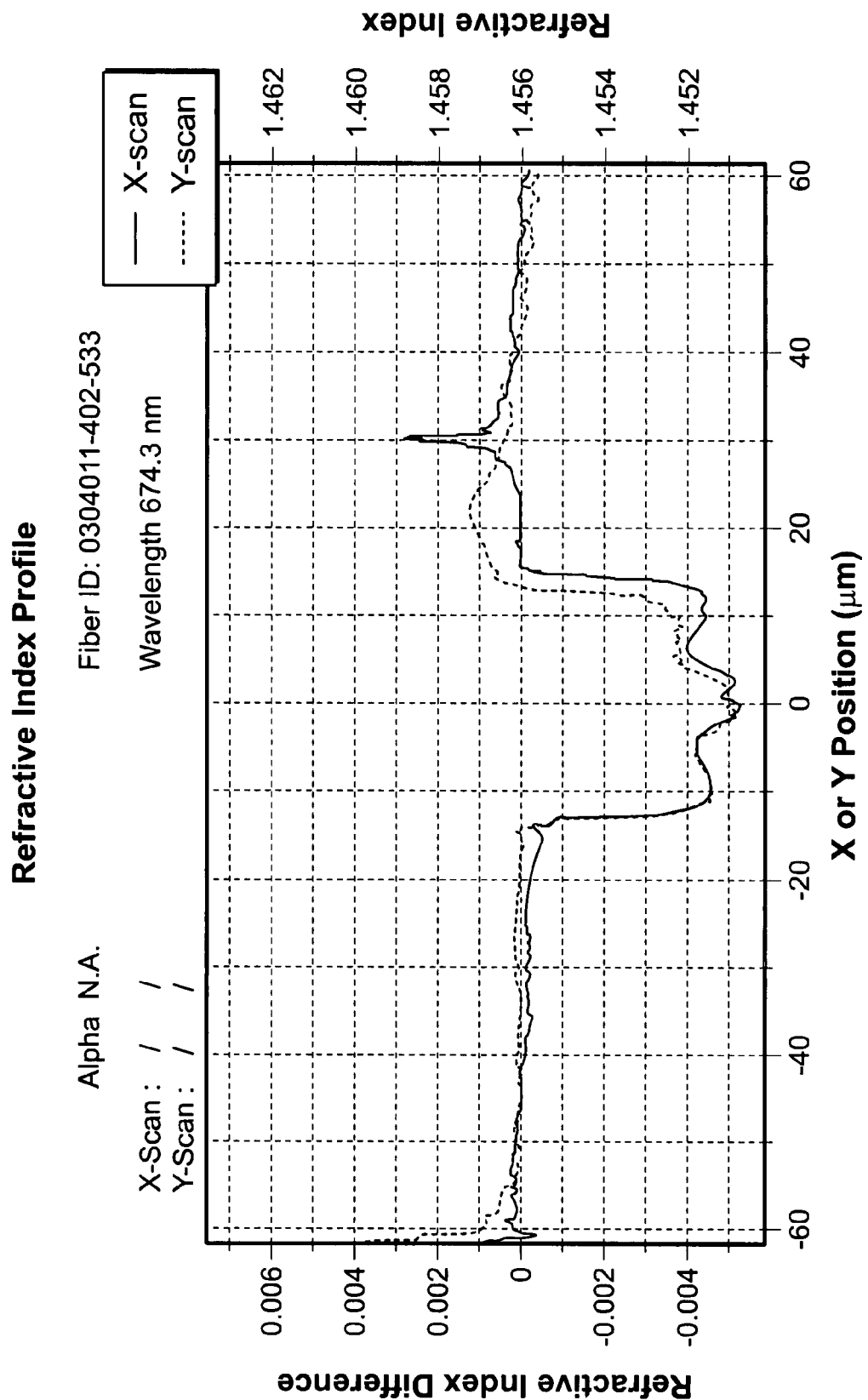
FIG. 6 shows a refractive index profile for a substrate having an outer diameter (OD) of 125 μm and a core diameter of 25 μm, having the refractive index difference plotted in relation to the X or Y position.
Figure 7:
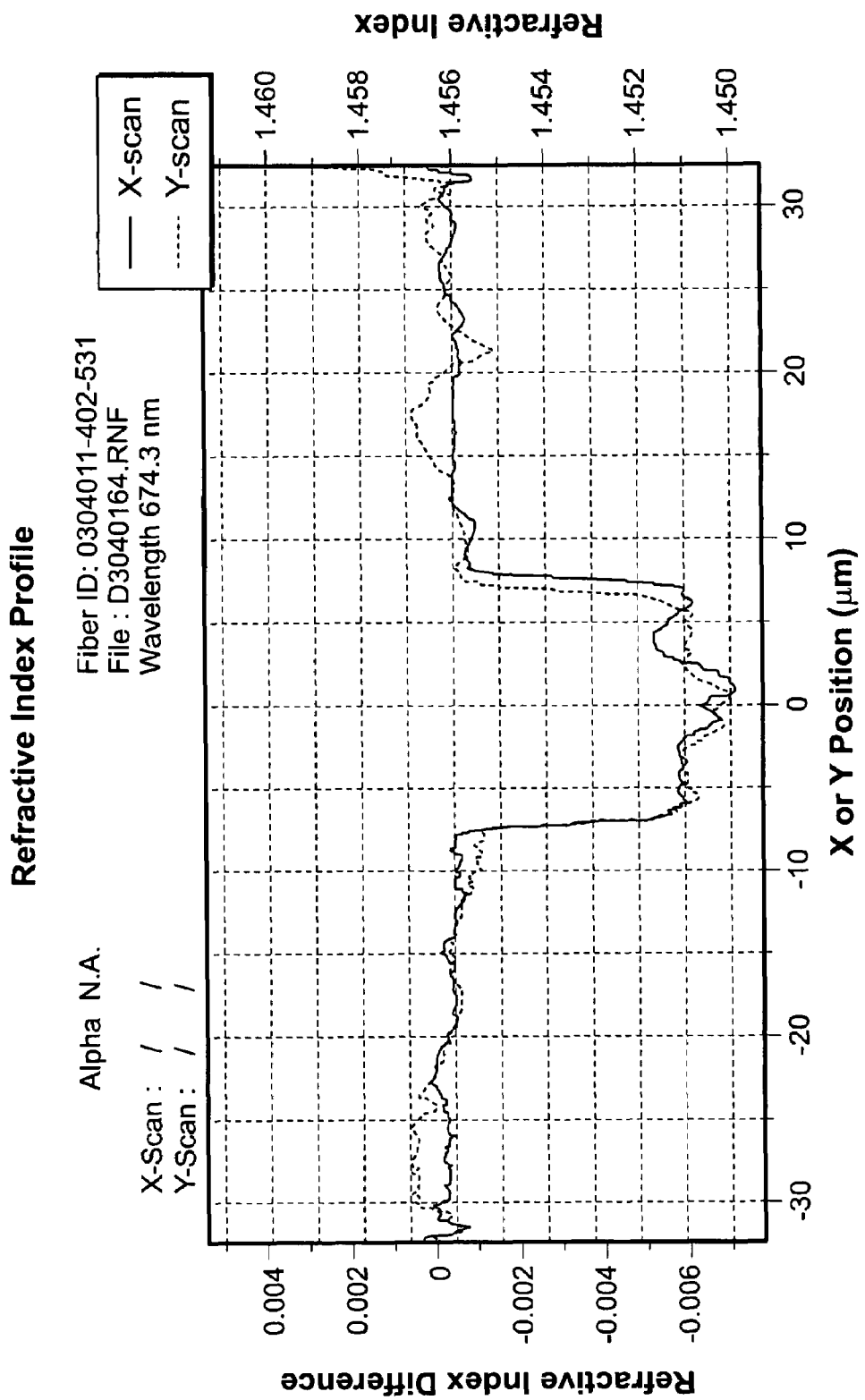
FIG. 7 shows a refractive index profile for a substrate having an outer diameter (OD) of 65 μm and a core diameter of 14 μm, having the refractive index difference plotted in relation to the X or Y position.
Figure 8:
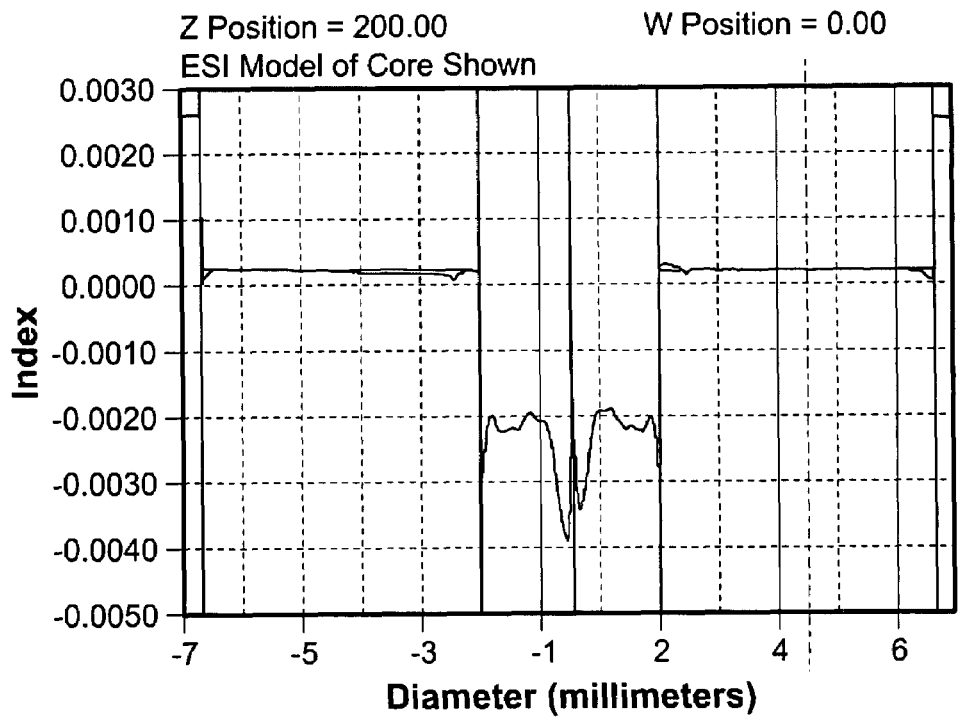
FIG. 8 shows a refractive index profile for a preform having an outer diameter of 13 mm and a core having a diameter of 3 mm.
Figure 9:
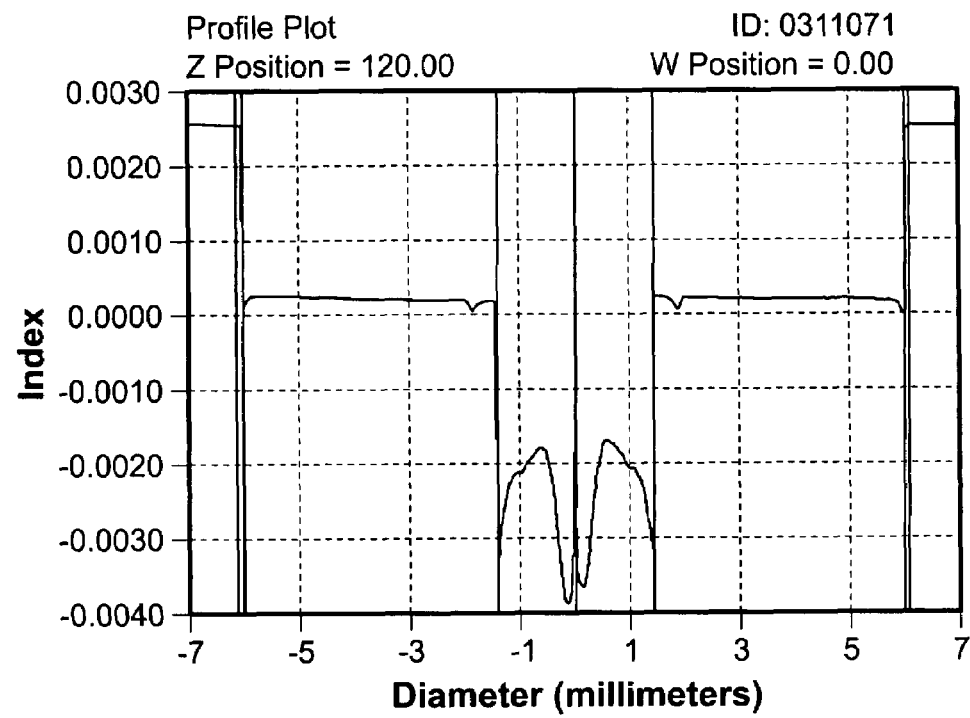
FIG. 9 shows a refractive index profile for a preform having an outer diameter of 12 mm and a core having a diameter of 2.4 mm.

FIG. 4(a) shows a schematic of the fiber geometry of an optical fiber or substrate 100 having a core 102 with a grating 103 and also having a cladding 104. As shown, the core 102 has a length L of about 10 μm and the grating 103 has a pitch of about 0.5 μm. In response to an optical signal having a wavelength λ=632 nanometers (nm) received at an angle $\Theta_i$, the grating 103 provides a reflected optical fiber at an angle $\Theta_o$ with respect to the normal consisting of a plurality of uniquely distinguishable signals covering an angle range of $\Theta^R$. The index of refraction of the cladding and core respectively are 1.458 and 1.455 (i.e. difference of 0.003). The reader is also referred to the graph in FIG. 5.

SCOPE OF THE INVENTION

Although the invention has been described and illustrated with respect to exemplary embodiments thereof, the foregoing and various other additions and omissions may be made therein and thereto without departing from the spirit and scope of the present invention.

I claim:

1. A non-waveguide optical identification element comprising a non-waveguide optical substrate that includes an inner region located at a geometric center of the optical substrate, the inner region being surrounded by an outer region, the inner region having an index of refraction that prevents the optical substrate from forming an optical waveguide, the optical substrate having an identification code imparted therein, wherein the inner region is a photosensitive optical region.

2. The non-waveguide optical identification element according to claim 1, wherein the identification code is written in the optical substrate as a Bragg grating.

3. The non-waveguide optical identification element according to claim 1, wherein the identification code is written in the inner region.

4. The non-waveguide optical identification element according to claim 1, wherein the identification code is written in the outer region.

5. The non-waveguide optical identification element according to claim 1, wherein the inner region has an index of refraction less than or equal to the outer region.

6. The non-waveguide optical identification element according to claim 1, wherein the outer region is a non-photosensitive optical region.

7. The non-waveguide optical identification element according to claim 1, wherein the inner and outer regions have indices of refraction that differ from one another in a manner that prevents the optical substrate from forming an optical waveguide.

8. The non-waveguide optical identification element according to claim 1, wherein the index of refraction of the outer region is uniform throughout the outer region.

9. The non-waveguide optical identification element according to claim 1, wherein the outer region has a common index of refraction as measured radially outward from the geometric center of the optical substrate.

10. The non-waveguide optical identification element according to claim 1, wherein the outer region includes a coded portion containing the identification code and wherein the index of refraction is uniform throughout the outer region outside of the coded portion.

11. The non-waveguide optical identification element according to claim 1, wherein the index of refraction of the inner region along the interface is less than the index of refraction of the outer region along the interface to prevent the optical substrate from forming an optical waveguide.

12. The non-waveguide optical identification element according to claim 1, wherein the inner region constitutes a solid substrate.

13. The non-waveguide optical identification element according to claim 1, wherein at least one of the inner and outer regions includes the identification code imparted therein.

14. A non-waveguide optical identification element comprising an inner region being surrounded by an outer region, the inner region being located at a geometric center of the element and having an index of refraction that is less than or equal to an index of refraction of the outer region, the element having a Bragg grating inscribed therein, wherein the inner region is a photosensitive optical region.

15. The non-waveguide optical identification element according to claim 14, wherein the outer region is a non-photosensitive optical region.

16. The non-waveguide optical identification element according to claim 14, wherein the photosensitive optical region is doped with Boron.

17. The non-waveguide optical identification element according to claim 14, wherein the photosensitive optical region is doped with excess amounts of Boron when compared to an amount of doping used for a standard telecom optical fiber.

18. The non-waveguide optical identification element according to claim 14, wherein the index of refraction of the outer region is uniform throughout the outer region.

19. The non-waveguide optical identification element according to claim 14, wherein the outer region has a common index of refraction as measured radially outward from the geometric center of the optical substrate.

20. The non-waveguide optical identification element according to claim 14, wherein the outer region includes a grating portion containing the Bragg grating and wherein the index of refraction is uniform throughout the outer region outside of the Bragg grating.

21. The non-waveguide optical identification element according to claim 14, wherein the index of refraction of the inner region along the interface is less than the index of refraction of the outer region along the interface to prevent the optical substrate from forming an optical waveguide.

22. The non-waveguide optical identification element according to claim 14, wherein the inner region constitutes a solid substrate.

23. The non-wave guide optical identification element according to claim 14, wherein at least one of the inner and outer regions includes the Bragg grating inscribed therein.

24. A microbead comprising a non-waveguide optical element having a photosensitive core surrounded by a non-photosensitive cladding, the photosensitive core being located at a geometric center of the optical element and having an index of refraction that is less than or equal to an index of refraction of the non-photosensitive cladding so as not to form an optical waveguide, and the photosensitive core also having a Bragg grating inscribed therein.

25. A microbead according to claim 24, wherein the photosensitive core is doped with Boron.

26. A microbead according to claim 24, wherein the photosensitive core is doped with excess amounts of Boron when compared to a standard telecom optical fiber.

* * * * *